(No Model.)  T. & G. M. PARKINSON.  3 Sheets—Sheet 1.
BOLTING SCREEN.

No. 449,913.  Patented Apr. 7, 1891.

Witnesses:  Inventors:

(No Model.) 3 Sheets—Sheet 2.

T. & G. M. PARKINSON.
BOLTING SCREEN.

No. 449,913. Patented Apr. 7, 1891.

Witnesses:
H. S. McArthur
Georgia P. Kramer

Inventors:
T. & G. M. Parkinson
by Foster & Freeman
Attorneys.

(No Model.) 3 Sheets—Sheet 3.

T. & G. M. PARKINSON.
BOLTING SCREEN.

No. 449,913. Patented Apr. 7, 1891.

Witnesses:
H. S. McArthur
Georgia P. Kramer

Inventors:
T. & G. M. Parkinson
by Foster & Freeman
Attorneys.

United States Patent Office.

TOM PARKINSON AND GEORGE MARSDEN PARKINSON, OF DONCASTER, ENGLAND.

BOLTING-SCREEN.

SPECIFICATION forming part of Letters Patent No. 449,913, dated April 7, 1891.

Application filed November 19, 1890. Serial No. 371,953. (No model.)

*To all whom it may concern:*

Be it known that we, TOM PARKINSON and GEORGE MARSDEN PARKINSON, subjects of the Queen of England, residing at Doncaster, in England, have invented certain new and useful Improvements in Bolting-Screens, of which the following is a specification.

This invention relates to oscillating sieves used for purifying, grading, or separating middlings, grain, or other substances and may be described as follows: Instead of using the whole surface of the tray or sieve for the purpose of purification or sifting the material under treatment, a narrow longitudinal channel suffices for our purpose. This runs the length of the tray, and is preferably tapered in width toward the delivery or tail end, so that the quantity of material sifted through at the head end and onward may not diminish the thickness of the stream and thus offer an unequal resistance to the pressure of wind which may be blown or exhausted through it. The remainder of the tray-surface, or the portion at the sides of the sieve is made up of solid or wind-proof sections, which serve as deposit-surfaces for the dust, and which, when the sieve portion is tapered, expand in width toward the delivery or tail end simultaneously with the diminishing width of the sifting portion. By this means if extra wind is required and provided and toward the tail end to operate on the heavy material still left on the surface of the sieve a gradually-increasing expansion room and deposit-surface is provided. These dead-sections provide expansion room for the air, decreasing its velocity and causing or allowing it to deposit the solid matter it may in its passage through the sieve have lifted from the material under treatment and to escape free from such solid matter at the outlet.

Figure 1:
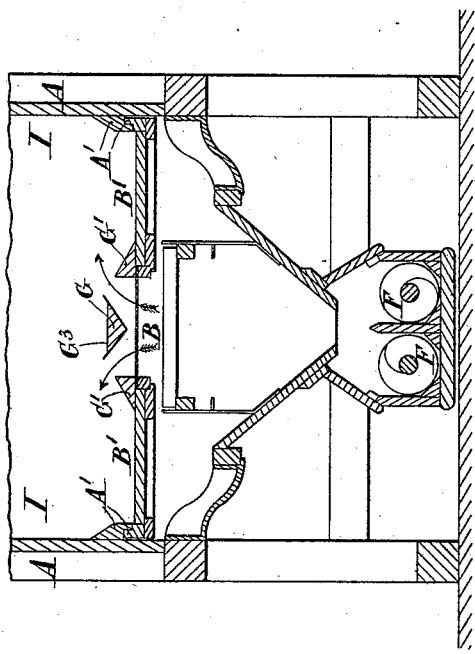
Figure 2:
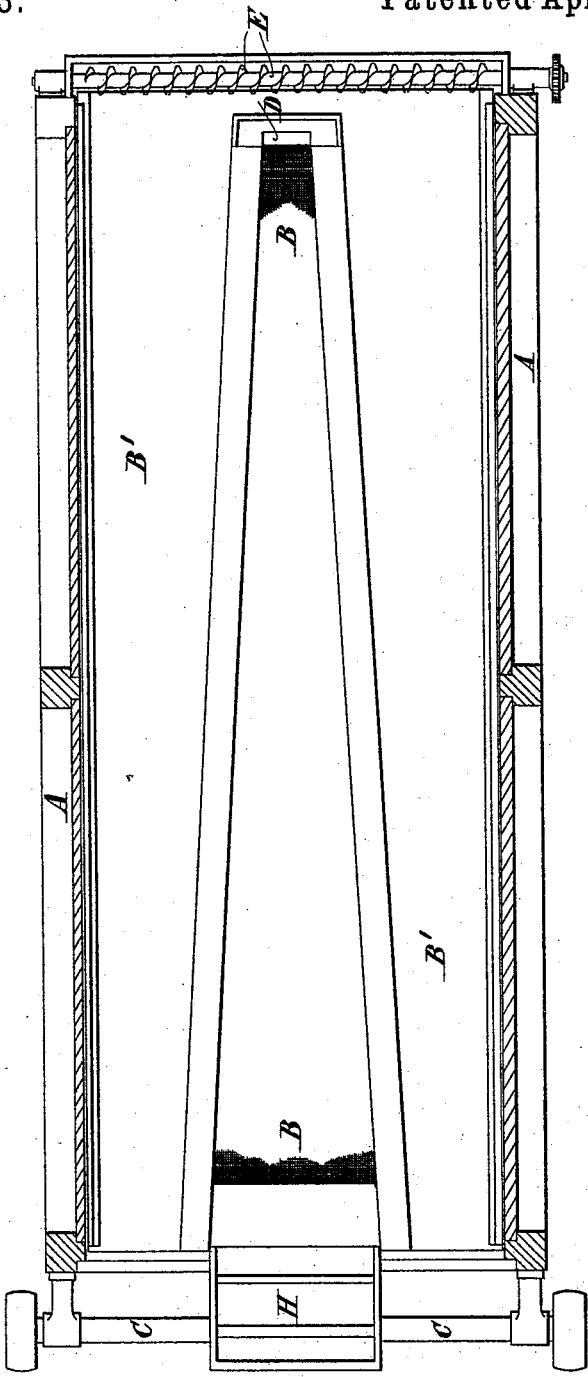
Figure 3:
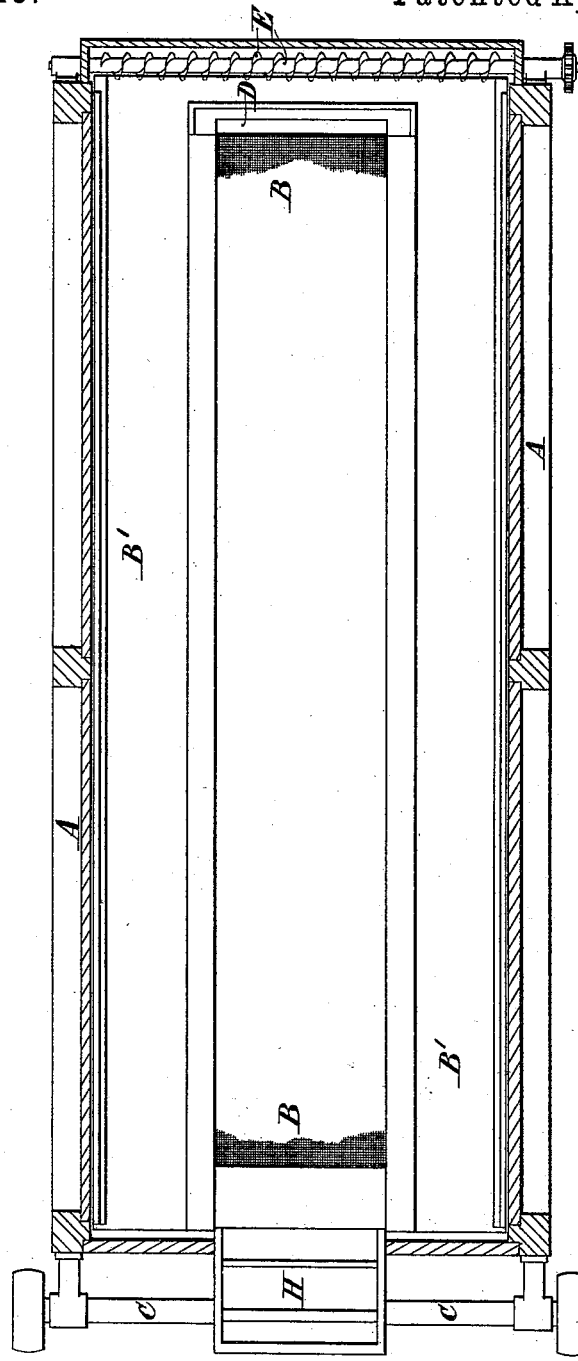

In the accompanying drawings, Figures 1 and 2 are a transverse vertical section and a horizontal section on the lines 1 1 and 2 2, respectively, of apparatus constructed according to this invention, the latter view representing the sieve and deposit-surfaces in plan and the hood or cowl removed. Fig. 3 is a similar view to Fig. 2, but shows a parallel-sided sieve.

Like letters indicate like parts in all the figures.

A is the case in which the apparatus is inclosed. The upper portion of the casing incloses a settling-chamber I, in which the air-currents decrease and the air expands and deposits the suspended matter upon the deposit-surfaces.

B is the sieve of silk, and B' the wind-proof sections or deposit-surfaces, which are located at and may constitute the bottom of the settling-chamber, and which together as one piece are preferably carried by vertical springs or rods, (not shown in the drawings,) so as to permit of the requisite vibratory movement being imparted by means of an eccentric on the shaft C or by other suitable means.

The size and shape of B can be varied; but Fig. 2 gives a fair idea of the preferred proportions, a sieve nine feet long and tapering in width from eighteen inches at the head end down to five inches at the tail end, as illustrated, giving excellent results in practice. The sieve and deposit-surfaces (hereinafter, for convenience when referred to as a whole, indicated by the letters B B') preferably incline toward the tail end, one in forty-eight being a suitable gradient; but they may incline more or less than this. At the outer longitudinal edges of B' are provided joint-strips A' and the head and tail ends of the machine B B' are connected to the case A by strips of cloth or equivalent material, all of which is for allowing B B' to be vibrated while preventing the leakage of air past its edges.

D is the outlet, through which falls the material passed over the sieve B, and from which material the dust or other impurities have been removed by the air-currents passing upward through the sieve, and E, Fig. 2, is a screw conveyer for conducting the dust and impurities from the tail end of B' to the outside of the machine.

F, Fig. 1, are screw conveyers for conducting to the outside of the machine the purified material which falls through the sieve B.

G, Fig. 1, is the hood which runs centrally from end to end over the sieve B to direct the lifted impurities onto B', and which is preferably connected by suitable supports to B'.

G' are cheeks secured to B B', one on each side of sieve B, to guide the material as it passes along the sifting-surface.

In the operation of the before-described apparatus the material to be treated is charged into the machine through the hopper H, Fig. 2, which delivers it onto the head or wider end of the vibrating sieve B. In passing over B a portion of the heavier purified material, according to the size of the particles, falls through the sieve and is conducted to the outside of the machine by the conveyers F, Fig. 1, and the lighter impurities are drawn or blown up from the sieve, as indicated by the arrows in Fig. 1, by the wind or air currents, which may be created by an exhaust-fan at the upper side or blowing-fan connected with the under side of the sieve, or by any other suitable means. The dust-laden wind which has passed through the sieve B enters the settling-chamber I, where it expands, and the dust previously suspended in it falls onto the deposit-surfaces B' and also onto the deposit-surface G³, formed on the top of the hood G, from all of which surfaces B' and G³ the dust falls into the trough of the conveyer E, by which it is conducted away.

When the settling-chamber I is of sufficient capacity in relation to the superficial area of the sieve B, experience has proved that practically no particles of dust are carried away into the surrounding atmosphere with the escaping wind, and so far as these proportions are duly observed it is immaterial whether the sieve and deposit-surfaces are tapered or parallel; but the former construction is preferred, because it compensates for the quantity of material sifted through at the head and onward and preserves a uniformity in the thickness of the stream of material and in the resistance presented to the wind blown or exhausted through it, and also by this tapered construction when extra wind is required and provided at and toward the tail end to operate on the heavy material still left on the sieve B a gradually-increasing expansion room in chamber I and increased surface B' for depositing the impurities it carries with it are provided. Moreover, as the dust gradually accumulates in quantity as it approaches the tail end of the sieve, the gradually-widening surfaces B' afford a means for carrying off this accumulation and preventing choking of the passages which might otherwise occur.

Even if the sieve B is not tapered, but throughout its length kept the same width as at the head end, as in Fig. 3, it will be seen that compared with ordinary sieves it is narrow in proportion to its length and to the size of the case A, in which it is inclosed.

The deposit-surfaces may either be formed in part and vibrate with the sieve, as before described, or they may be stationary.

We claim—

1. In apparatus such as described, the combination, with a settling-chamber, of a shaking sieve at the bottom of the chamber, dead-spaces or deposit-surfaces also at the bottom of the chamber and at the sides of the sieve, means of passing a current of air through the sieve, and a deflector for directing the air over the deposit-surfaces, the space over the deposit-surfaces being unobstructed to permit the air to expand and decrease in velocity and thereby deposit the suspended matter, substantially as described.

2. In apparatus such as described, the combination, with the settling-chamber, of a shaking sieve at the bottom of the chamber, means for passing a current of air through the sieve, and side deposit-surfaces also at the bottom of the chamber, said sieve tapering toward its delivery end and said deposit-surfaces gradually widening toward said delivery end, substantially as and for the purpose described.

In testimony whereof we have hereto set our hands in the presence of the two subscribing witnesses.

TOM PARKINSON.
GEORGE MARSDEN PARKINSON.

Witnesses:
ARTHUR BOWMAN BROWN,
  42 *High Street, Doncaster,*
WILFRED HENRY SIMPSON,
  3 *East Laith Gate, Doncaster,*
*Clerks to Messrs. Parkin & Co., Solicitors, Doncaster.*